Nov. 13, 1962 J. A. SIRONS 3,064,256

RADIO COMPASS

Filed May 3, 1961 2 Sheets-Sheet 1

INVENTOR.
JANIS A. SIRONS
BY Wade Koontz
ATTORNEY
and
James S. Shannon
AGENT

Nov. 13, 1962 J. A. SIRONS 3,064,256

RADIO COMPASS

Filed May 3, 1961 2 Sheets-Sheet 2

INVENTOR.
JANIS A. SIRONS

BY Wade Koontz
ATTORNEY
and
James S. Shannon
AGENT

United States Patent Office 3,064,256

Patented Nov. 13, 1962

3,064,256

RADIO COMPASS

Janis A. Sirons, Springfield, Ohio, assignor to the United States of America as represented by the Secretary of the Air Force Filed May 3, 1961, Ser. No. 107,597

3 Claims. (Cl. 343—120)

(Granted under Title 35, U.S. Code (1952), sec. 266)

The invention described herein may be manufactured and used by or for the United States Government for governmental purposes without payment to me of any royalty thereon.

The purpose of this invention is to improve the performance of a radio compass by extending the range over which a uniform indication of a given heading error is obtainable.

The invention is particularly applicable to radio compasses of the type described and claimed in my United States Patent 2,968,035, issued January 10, 1961. In a radio compass of this type the directivity of the receiving antenna is alternately switched at an audio rate between two overlapping lobes, one having directivity to the left and one to the right of the longitudinal axis of the aircraft or other vehicle carrying the compass. The lobe switching results in an amplitude modulation, at the switching frequency, of the input signal to the compass receiver which is equipped with automatic gain control to make its audio output as nearly independent of received signal strength as possible. The magnitude of the heading error is then given by the magnitude of the audio output of the receiver and the sign of the error is given by the phase of the audio output relative to the switching cycle. This comparison is made by means of a phase sensitive rectifier which has a direct current output the magnitude and sign of which give the magnitude and direction of the homing error. A zero center direct current meter is used to indicate the magnitude and sign of the rectifier output and hence the magnitude and sense of the heading error.

Since the output of the phase sensitive rectifier is proportional to the amplitude of the audio voltage applied to it, the indication of a given heading error will be constant only over the range of received signal strengths for which the AGC (Automatic Gain Control) of the receiver is able to maintain a substantially constant audio output. As the input signal falls below the minimum of this range the audio output of the receiver falls off rather rapidly with a corresponding decrease in the heading error indication. In accordance with the invention this decline in audio voltage is counteracted by an appropriate increase in the gain of the audio amplifier through the agency of an AGC amplifier-limiter controlled by the receiver AGC voltage. In this manner, the receiver audio output and the heading error indication are held substantially constant to a much lower received signal strength.

Figures 1, 2:
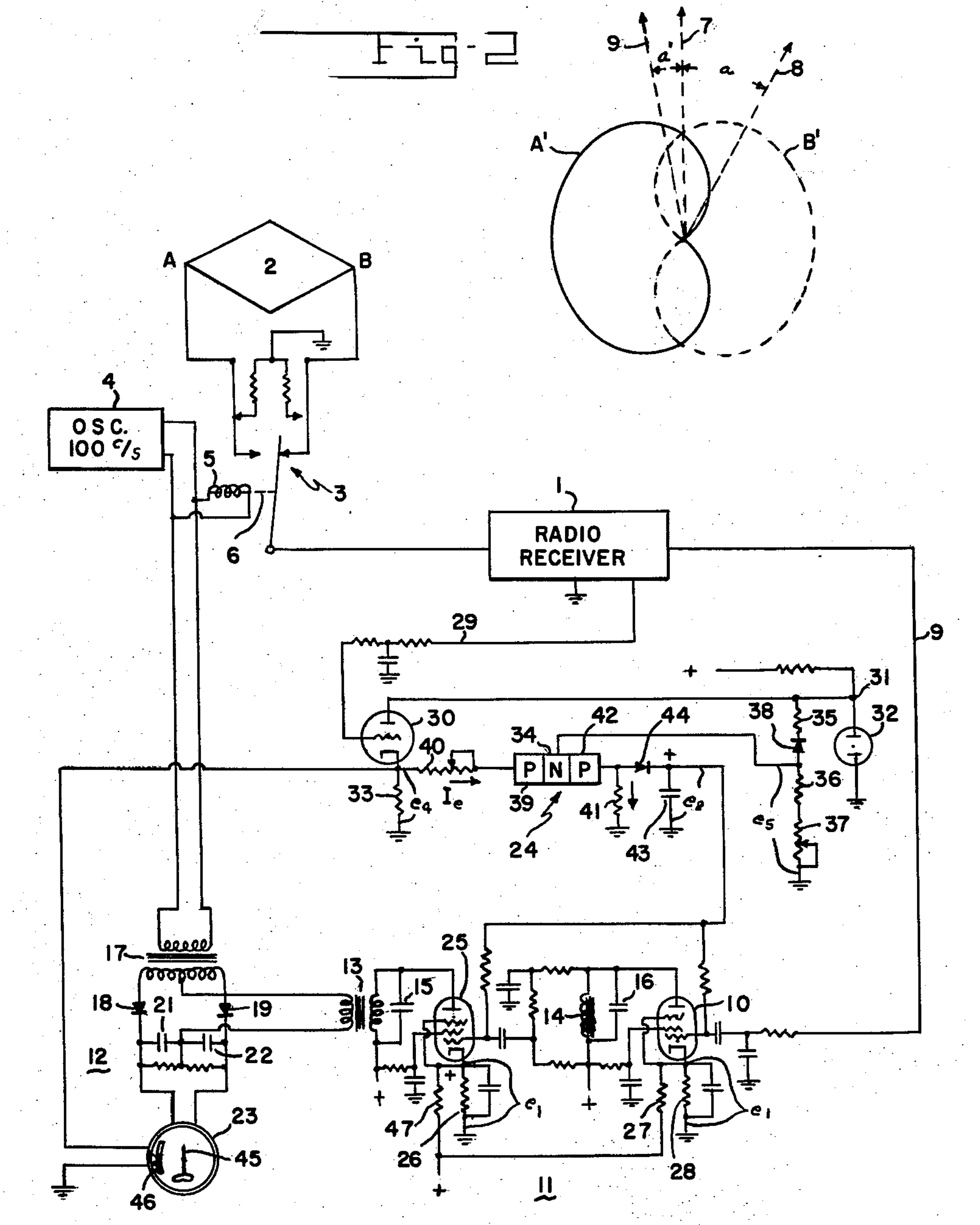
Figure 5:
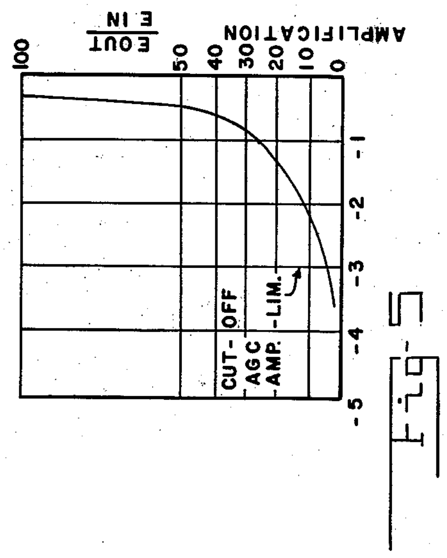
Figure 3:
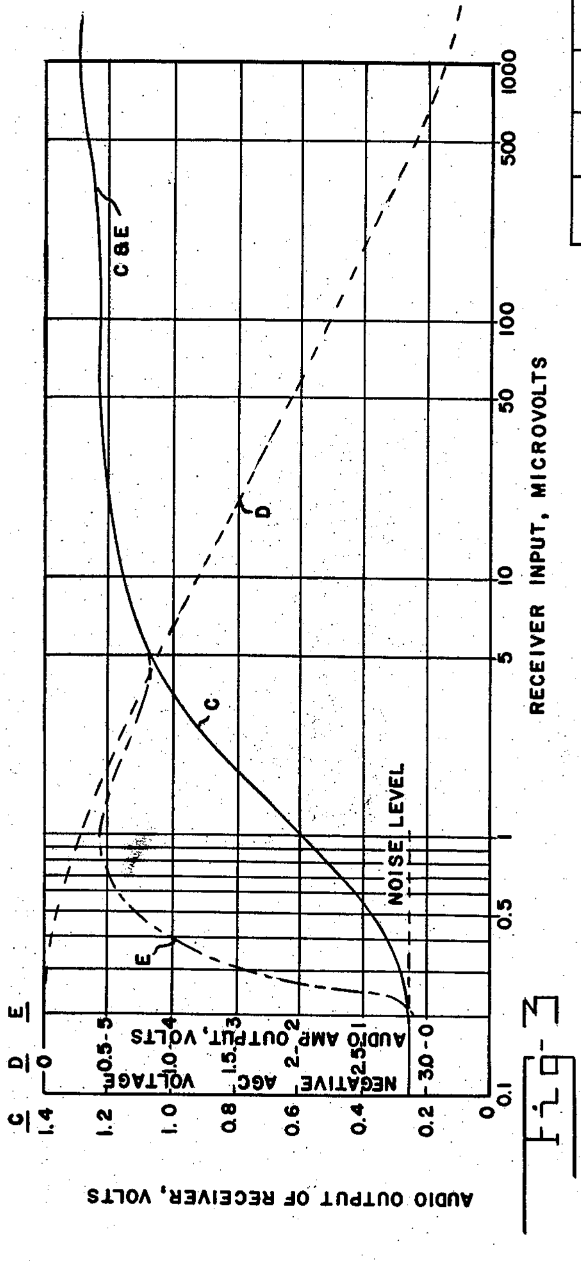
Figure 4:
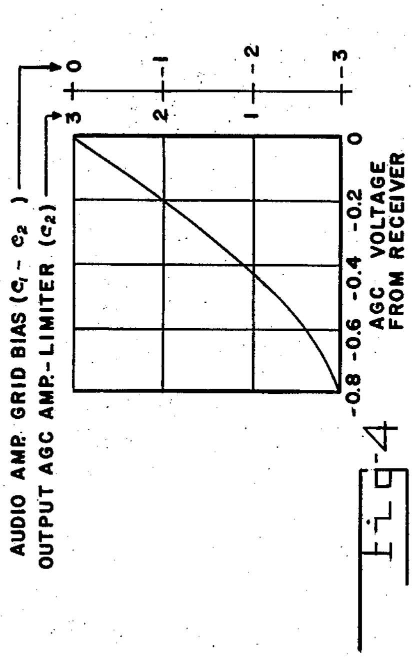

The invention will be described in more detail with reference to the specific embodiment thereof shown in the accompanying drawings in which FIG. 1 is a schematic diagram of a radio compass incorporating the invention, FIG. 2 is a polar diagram of the antenna pattern, FIG. 3 is a graph showing the variation of audio voltage, with and without the invention, and the variation of AGC voltage with respect to received signal strength, FIG. 4 illustrates the operation of the AGC amplifier-limiter, and FIG. 5 shows the audio amplifier gain characteristic.

Referring to the drawing, FIG. 1 shows schematically a radio compass of the general type described in Patent 2,968,035 referred to above but incorporating the invention. A radio receiver 1 obtains its input from a UHF rhombic antenna 2 through a cyclic switch 3 which periodically interchanges points A and B as the feed and terminating points of the antenna. The switch is driven by applying an alternating voltage in the low audio frequency range, for example, 100 c./s., derived from oscillator 4, to coil 5. Armature 6 is polarized so that the switch has the same frequency as source 4. A suitable switch for this purpose is described and claimed in my United States Patent 2,901,748, issued August 25, 1959.

During one half of each cycle of operation of switch 3 point A is the feed point of the antenna, point B is the terminating point and the antenna pattern is as shown by polar diagram A′ in FIG. 2; during the other half cycle point B is the feed point, point A the terminating point and the pattern is as shown by diagram B′. When the homing transmitter is located in direction 7, the zero heading error condition, the signal received through lobe A′ equals the signal received through lobe B′ and the 100 c./s. amplitude modulation of the signal at the input to the receiver due to the switching cycle is zero. Where heading errors exist, such as in the cases of directions 8 and 9 where the errors are represented by the angles *a* and *a′*, a 100 c./s. rectangular wave modulation of the receiver input signal occurs because of the dissimilar gains of the two antenna lobes in the given direction. The magnitude of this modulation is directly related to the heading error and its phase is either the same as or opposite to that of the alternating voltage across coil 5 depending upon whether the homing error is a clockwise or a counterclockwise error.

The amplitude modulated radio frequency input to receiver 1 is demodulated by the second detector of the receiver with the result that a 100 c./s. rectangular wave appears on line 9 whenever there is a heading error. This wave is applied to the grid of first stage tube 10 of two stage audio amplifier 11, the amplified output of which is applied to phase sensitive rectifier 12 by means of transformer 13. Coupling inductance 14 and the primary of transformer 13 together with condensers 15 and 16 constitute two resonant networks tuned to 100 c./s. for the purpose of eliminating all of the components of the input rectangular wave except the fundamental from the output of the amplifier. The voltage at the secondary of transformer 13 is, therefore, a 100 c./s. sine wave the amplitude of which is directly related to the heading error and the phase of which is either the same as or opposite to that of oscillator 4 depending upon the sense of the heading error.

The operation of phase sensitive rectifier 12 is well understood in the art. Equal and oppositely phased voltages from source 4 are applied by the center tapped secondary of transformer 17 to rectifiers 18 and 19. If the output of audio amplifier 11 is zero, as in the case of zero heading error, equal direct voltages of opposite polarity are developed across condensers 21 and 22 so that the net direct voltage applied to indicator 23 is zero and its pointer 45 remains in the center or on-course position. When a heading error is present, a 100 c./s. alternating voltage appears at the secondary of transformer 13 which, as stated before, has an amplitude directly related to the error magnitude and a phase that is the same as or opposite to the phase of the voltage at coil 5 depending upon the sense of the heading error. Therefore rectifiers 18 and 19 have an additional voltage applied thereto which will be in phase with the voltage applied by the secondary of transformer 17 for one rectifier and opposite in phase to the secondary voltage for the other rectifier. This results in unequal voltages across condensers 21 and 22 and a net direct voltage applied to meter 23 the magnitude of which is proportional to the amplitude of the voltage at the transformer 13 secondary and the polarity of which is determined by the phase of this voltage. Consequently, in the presence of a heading error, the pointer 45 of indicator 23 is deflected from its zero position by an amount directly related to the heading error and in a direction from zero that indicates the sense of the heading error.

Since the output of rectifier 12 is proportional to the amplitude of the audio voltage at the secondary of transformer 13, it is apparent that a uniform indication of a given heading error will be obtained only for that range of receiver input signal levels over which this audio voltage is independent of received signal strength. The receiver 1 is equipped with an AGC circuit for the purpose of making its audio output substantially independent of received signal strength. However, AGC circuits lose their effectiveness at the lower signal levels. This is illustrated by curve C in FIG. 3 where it is seen that the audio output, i.e. the audio voltage on line 9 in FIG. 1, for a fixed percentage modulation, is held substantially constant for all received signal levels down to about 5 microvolts. Below this level the audio output falls off rapidly until the output is lost in the receiver noise at about 0.2 microvolt. The manner in which the negative AGC voltage produced by the AGC system of the receiver varies with receiver input is shown by curve D. In accordance with the invention the gain of audio amplifier 11 is regulated under the control of the AGC voltage in such a way that the variation of its audio output voltage with received signal strength is as shown by curve E. Since the received signal strength decreases as the distance to the transmitter increases the result is a considerable increase in the maximum range at which an accurate heading error indication can be obtained.

The regulation of the gain of audio amplifier 11 for the above purpose is effected by an amplifier-limiter circuit comprising transistor 24 which operates to control the grid bias of tubes 10 and 25 of the audio amplifier. These tubes are of the type in which the amplification is a function of the grid bias such, for example, as the 6BA6 remote cut-off pentode. The grid-cathode bias for each of tubes 10 and 25 is equal to the difference between the voltages $e_1$ and $e_2$. The voltage $e_1$, provided by potential dividers 47—26 and 27—28, has a fixed value which may be 3 volts, for example. The voltage $e_2$ is produced by the amplifier-limiter circuit in accordance with the receiver input level as represented by the receiver AGC voltage and may vary from 0 to 3 volts, for example.

Considering the amplifier-limiter in more detail, the negative AGC voltage from the receiver, the magnitude of which is proportional to received signal strength, is applied over conductor 29 to the grid of cathode follower tube 30. Tube 30 is supplied with a stable anode voltage from the high potential terminal 31 of voltage regulator 32 and its cathode is connected to ground through a load resistor 33. The parameters of the circuit may be adjusted, for example, so that when the AGC voltage is zero the cathode voltage $e_4$ of the tube 30 is 3 volts. The base 34 of PNP junction transistor 24 is held at a constant positive potential $e_5$ relative to ground by means of a potential divider 35—36—37. This potential divider may also contain a reverse connected silicon diode 38, or else a thermistor, to counteract the effect of temperature changes on the base voltage. The cathode of tube 30 is connected to the emitter 34 of the transistor by means of resistor 40 so that the voltage across the emitter-base junction is equal to $e_4-e_5$. An output resistor 41 connects the collector 42 to ground and thereby applies the voltage $e_5$ across the collector-base junction of the transistor. It will be apparent that $e_5$ biases the collector-base junction in the reverse direction and that the emitter-base junction is also biased in the reverse direction when $e_4<e_5$. Consequently when $e_4<e_5$ the emitter current $I_e$ is zero, the collector current $I_c$ is zero and $e_2$ is zero.

The AGC amplifier-limiter circuit is designed for emitter current to begin at the received signal strength below which it is desired to boost the audio output. In the example given, this received signal strength is 5 microvolts. As seen from curve D in FIG. 3, the AGC potential corresponding to 5 microvolts signal input is −0.8 volt. Therefore, with a tube 30 control grid potential relative to ground of −0.8 volt, the base potential $e_5$ is adjusted by variable resistor 37 until it equals $e_4$. Under this condition $I_e$ is zero and the drop across resistor 41 is substantially zero since the back current across the collector-base junction is extremely small. With this adjustment of the circuit the gain of amplifier 11 is constant for all received signal strengths above 5 microvolts since, for these signals, $e_4<e_5$ and $e_2=0$ so that the grid bias on tubes 10 and 25 has a constant value $e_1$. When the received signal falls below 5 microvolts $e_4$ becomes greater than $e_5$ and emitter current begins to flow. This results in a collector current and the development of a voltage across resistor 41 which causes condenser 43 to charge through crystal diode 44. The condenser voltage $e_2$ opposes the fixed bias $e_1$ thereby lowering the negative grid biases of tubes 10 and 25 and increasing their amplification. As the received signal level decreases the negative AGC voltage decreases causing a rise in $e_2$ and a decrease in the audio amplifier bias as shown in FIG. 4. FIG. 5 shows the gain of audio amplifier 11 versus grid bias. The gain of transistor amplifier 24 may be adjusted by resistor 40 to provide the desired degree of control of amplifier 11. In the example given, the gain adjustment is such that $e_2$ reaches substantially 3 volts when the AGC voltage is zero, as seen in FIG. 4.

The purpose of germanium diode 44 is to provide a high resistance discharge path for condenser 43 which must discharge in the back direction of the diode. This prevents a fast discharge of condenser 43 and thereby prevents large fluctuations of the indicator 23 heading error pointer 45.

Since, for a given transmitter power, the AGC voltage of the receiver is roughly inversely related to range, the voltage $e_4$ may also be used to drive a direct current meter having a range pointer 46 incorporated in indicator 23.

I claim:

1. A radio compass comprising a directive receiving antenna and associated means for periodically switching its directive pattern between two similar differently directed overlapping lobes whereby the radio frequency output of said antenna in the presence of a heading error has a switching frequency amplitude modulation the magnitude of which is directly related to the magnitude of the heading error and the phase of which relative to the switching cycle is indicative of the sense of the heading error; a radio receiver connected to said antenna for receiving and demodulating the radio frequency output of the antenna whereby the said modulation of the antenna output appears at the output of the receiver, said receiver having an automatic gain control circuit for making its output substantially independent of its input over a certain range of received signal strengths, said gain control circuit producing an automatic gain control voltage substantially proportional to the magnitude of the received radio frequency signal; a phase sensitive rectifier synchronized with said switching cycle and coupled to the output of said amplifier for producing a direct output voltage proportional to the amplifier output and of polarity determined by the phase of the amplifier output relative to the switching cycle; a heading error indicator actuated by the output of said rectifier; and means responsive to the automatic gain control voltage of said receiver for controlling the gain of said variable gain amplifier, said means operating when said automatic gain control voltage exceeds a predetermined value to hold the gain of said amplifier constant, and operating when said automatic gain control voltage is less than said predetermined value to increase the gain of said amplifier in direct relation to the difference between said automatic gain control voltage and said predetermined value, said predetermined value of automatic gain control voltage being the value of automatic gain control voltage corresponding to a received signal strength at the lower end of said range of received signal strengths over which the receiver output is substantially independent of received signal strength.

2. A radio compass comprising a directive receiving antenna and associated means for periodically switching its directive pattern between two similar differently directed overlapping lobes whereby the radio frequency output of said antenna in the presence of a heading error has a switching frequency amplitude modulation the magnitude of which is directly related to the magnitude of the heading error and the phase of which relative to the switching cycle is indicative of the sense of the heading error; a radio receiver connected to said antenna for receiving and demodulating the radio frequency output of the antenna whereby the said modulation of the antenna output appears at the output of the receiver, said receiver having an automatic gain control circuit for making its output substantially independent of its input over a certain range of received signal strengths, said gain control circuit producing an automatic gain control voltage substantially proportional to the magnitude of the received radio frequency signal; a phase sensitive rectifier synchronized with said switching cycle and coupled to the output of said amplifier for producing a direct output voltage proportional to the amplifier output and of polarity determined by the phase of the amplifier output relative to the switching cycle; a heading error indicator actuated by the output of said rectifier; a cathode follower circuit comprising an amplifying tube having an anode at constant potential, a cathode and a grid; means applying the automatic gain control voltage of said receiver between the grid of said tube and a point of reference potential; a load resistor connected between the cathode of said tube and said point of reference potential; a PNP junction transistor; means establishing the base of said transistor at a fixed positive potential relative to said point of reference potential; a conductive connection between the cathode of said tube and the emitter of said transistor; a load resistor connected between the collector of said transistor and said point of reference potential; and means utilizing the voltage developed across said transistor load resistor to control the gain of said variable gain amplifier in direct relation thereto.

3. Apparatus as claimed in claim 2 in which said transistor base potential equals the cathode potential of said cathode follower when the received signal strength at the receiver input is at the lower end of the range of received signal strengths over which the receiver output is substantially independent of received signal strength.

References Cited in the file of this patent

UNITED STATES PATENTS

| | | |
|---|---|---|
| 2,107,633 | Hooven | Feb. 8, 1938 |
| 2,968,035 | Sirons | Jan. 10, 1961 |